(12) United States Patent
Copeland et al.

(10) Patent No.: US 7,420,463 B2
(45) Date of Patent: Sep. 2, 2008

(54) WIDE EXIT ELECTRONIC ARTICLE SURVEILLANCE ANTENNA SYSTEM

(75) Inventors: Richard L. Copeland, Lake Worth, FL (US); Stewart E. Hall, Wellington, FL (US); William Farrell, West Palm Beach, FL (US); Stanley Strzelec, Delray Beach, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 0 days.

(21) Appl. No.: 10/854,877

(22) Filed: May 27, 2004

(65) Prior Publication Data

US 2004/0217866 A1 Nov. 4, 2004

Related U.S. Application Data

(63) Continuation-in-part of application No. 10/341,824, filed on Jan. 14, 2003, now Pat. No. 7,091,858, and a continuation-in-part of application No. 10/745,128, filed on Dec. 22, 2003, now Pat. No. 7,154,447.

(60) Provisional application No. 60/478,944, filed on Jun. 16, 2003.

(51) Int. Cl.
*B60C 23/00* (2006.01)

(52) U.S. Cl. .................. 340/447; 340/568.1; 340/10.1; 340/572.3

(58) Field of Classification Search .................. 340/447, 340/568.1, 572.1–572.9, 571, 741, 10.1, 340/10.4, 10.5, 573.1; 343/700 R, 866
See application file for complete search history.

(56) References Cited

U.S. PATENT DOCUMENTS

| | | | | |
|---|---|---|---|---|
| 4,016,553 A | * | 4/1977 | Novikoff et al. | 340/572.7 |
| 4,135,144 A | * | 1/1979 | Elmasian | 340/906 |
| 4,135,184 A | * | 1/1979 | Pruzick | 340/572.5 |
| 4,308,530 A | * | 12/1981 | Kip et al. | 340/572.2 |
| 5,220,338 A | * | 6/1993 | Matsushita | 343/787 |
| 5,345,222 A | * | 9/1994 | Davies et al. | 340/572.7 |
| 5,459,451 A | * | 10/1995 | Crossfield et al. | 340/572.7 |
| 6,195,009 B1 | * | 2/2001 | Irizarry et al. | 340/573.4 |
| 6,232,879 B1 | * | 5/2001 | Tyren | 340/572.6 |
| 6,400,273 B1 | * | 6/2002 | Bettine | 340/572.4 |
| 6,696,954 B2 | * | 2/2004 | Chung | 340/572.7 |
| 6,836,216 B2 | * | 12/2004 | Manov et al. | 340/572.7 |
| 6,927,738 B2 | * | 8/2005 | Senba et al. | 343/787 |

* cited by examiner

*Primary Examiner*—Daniel Previl

(57) ABSTRACT

An electronic article surveillance (EAS) antenna system including at least one transmit antenna and at least one amorphous core receiver antenna adapted for installation on the floor, in the grout region of the floor, or under the flooring of a passageway. An EAS system including at least one perimeter loop antenna adapted to extend around the entire perimeter of a passageway is also provided. The system may further include at least one floor antenna adapted for installation within a region of a floor of a passageway and at least one ceiling antenna adapted for installation adjacent a ceiling of the passageway.

4 Claims, 14 Drawing Sheets

LATERAL

HORIZONTAL

VERTICAL

WIDE EXIT ELECTRONIC ARTICLE SURVEILLANCE ANTENNA SYSTEM

CROSS-REFERENCE TO RELATED APPLICATIONS

This application is a continuation-in-part of U.S. application Ser. No. 10/341,824, filed Jan. 14, 2003, now U.S. Pat. No. 7,091,858 and is a continuation-in-part of U.S. application Ser. No. 10/745,128, filed Dec. 22, 2003, now U.S. Pat. No. 7,154,447 and claims the benefit of U.S. Provisional Application Ser. No. 60/478,944, filed Jun. 16, 2003, the teachings of which applications are incorporated herein by reference.

FIELD OF THE INVENTION

This invention relates to electronic article surveillance (EAS) systems and more particularly to an EAS antenna system adapted for environments having wide exits and entrances.

BACKGROUND OF THE INVENTION

Electronic Article Surveillance (EAS) systems are detection systems that allow the identification of a marker or tag within a given detection region. EAS systems have many uses, but most often they are used as security systems for preventing shoplifting in stores or removal of property in office buildings. EAS systems come in many different forms and make use of a number of different technologies.

A typical EAS system includes an electronic detection unit, markers and/or tags, and a detacher or deactivator. The detection units can, for example, be formed as pedestal units, buried under floors, mounted on walls, or hung from ceilings. The detection units are usually placed in high traffic areas, such as entrances and exits of stores or office buildings. The markers and/or tags have special characteristics and are specifically designed to be affixed to or embedded in merchandise or other objects sought to be protected. When an active marker passes through a marker detection region, the EAS system sounds an alarm, a light is activated, and/or some other suitable alert devices are activated to indicate the removal of the marker from the prescribed area.

Common EAS systems operate with these same general principles using either transceivers, which each transmit and receive, or a separate transmitter and receiver. Typically the transmitter is placed on one side of the detection region and the receiver is placed on the opposite side of the detection region. The transmitter produces a predetermined excitation signal in a marker detection region. In the case of a retail store, this detection region is usually formed at a checkout aisle or an exit. When an EAS marker enters the detection region, the marker has a characteristic response to the excitation signal, which can be detected. For example, the marker may respond to the signal sent by the transmitter by using a simple semiconductor junction, a tuned circuit composed of an inductor and capacitor, soft magnetic strips or wires, or vibrating resonators. The receiver subsequently detects this characteristic response. By design, the characteristic response of the marker is distinctive and not likely to be created by natural circumstances.

EAS systems are often called upon for coverage of a large detection area, such as a wide mall store entrance. The mall store entrance can sometimes cover the width of the mall store itself. Such relatively large detection areas require special design considerations. For example, the EAS system used for coverage must be carefully designed to avoid any gaps through which a marker might pass through undetected, while simultaneously avoiding false alarming caused by markers attached to store inventory which may be displayed near the detection region.

When conventional EAS antenna systems, typically formed of loop antennas, are used in openings wider than about 2.0 meters, detection performance begins to deteriorate. Wide mall store entrances may need detection areas up to about 6 meters wide. As used herein, wide exits and wide entrances refer to exits/entrances having widths greater than or equal to about 2.0 meters. Attempts at solutions to the wide entrance environment include adding additional antennas in the floor and/or ceiling. Adding loop antennas in existing flooring causes many problems, as the floor must be torn up in order to install the loop antenna.

SUMMARY OF THE INVENTION

According to one aspect of the invention, there is provided an electronic article surveillance antenna system including at least one transmit antenna and at least one amorphous core receiver antenna adapted for installation on the floor, in the grout region of the floor, or under the flooring of a passageway. The output of the amorphous core receiver antenna is connectable to a receiver for detection of a response signal from an electronic article surveillance tag disposed in the passageway. The response signal is responsive to the interrogation signal established by the transmitter.

According to another aspect of the invention, there is provided an electronic article surveillance antenna system including at least one perimeter loop antenna adapted to extend around the entire perimeter of a passageway. The perimeter loop antenna may be configured as a transmitter antenna for generating an interrogation signal in the passageway. The system may further include at least one floor loop antenna adapted for installation within a region of a floor of a passageway and at least one ceiling core antenna adapted for installation adjacent a ceiling of the passageway. The ceiling core antenna may be configured as a transmitter antenna for generation of an interrogation signal for transmission into the passageway. The floor loop antenna may be configured as a receiver for receiving a response signal from an electronic article surveillance tag disposed the passageway, the response signal being responsive to the interrogation signal.

According to another aspect of the invention, there is provided method of establishing an EAS or RFID interrogation zone in a passageway, the method including: providing at least one perimeter loop antenna extending around the entire perimeter of the passageway, the perimeter loop antenna configured as a transmitter antenna for generating an interrogation signal in the passageway.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

For simplicity and ease of explanation, the present invention will be described herein in connection with various exemplary embodiments thereof. Those skilled in the art will recognize, however, that the features and advantages of the present invention may be implemented in a variety of configurations. It is to be understood, therefore, that the embodiments described herein are presented by way of illustration, not of limitation.

It has been discovered that an amorphous core receiver antenna is significantly more sensitive compared to traditional loop antennas and ferrite core receiver antennas. In fact, an amorphous core receiver antenna has a higher sensitivity over the ferrite antenna by a factor of 10-20 per unit volume of core material. This discovery led to the invention of the core transceiver antenna, U.S. patent application Ser. No. 10/037,337, filed on Dec. 21, 2001, the disclosure of which is incorporated herein by reference.

It has also been determined that a very small and thin core receiver antenna may be made to fit inside of the grout region in tile floors, or be easily mounted under the tile in the floor. An array of such receiver antennas may be used as a receiver antenna array for very wide detection systems. In addition to the small floor-mounted core receiver antennas, larger core receiver antennas can be used on the ceiling and/or sidewalls of the entrance zone if the floor installation was not desired. Either traditional loop transmitter antennas or core transmitter antennas could comprise the excitation field source for such a wide detection system.

Figure 1:
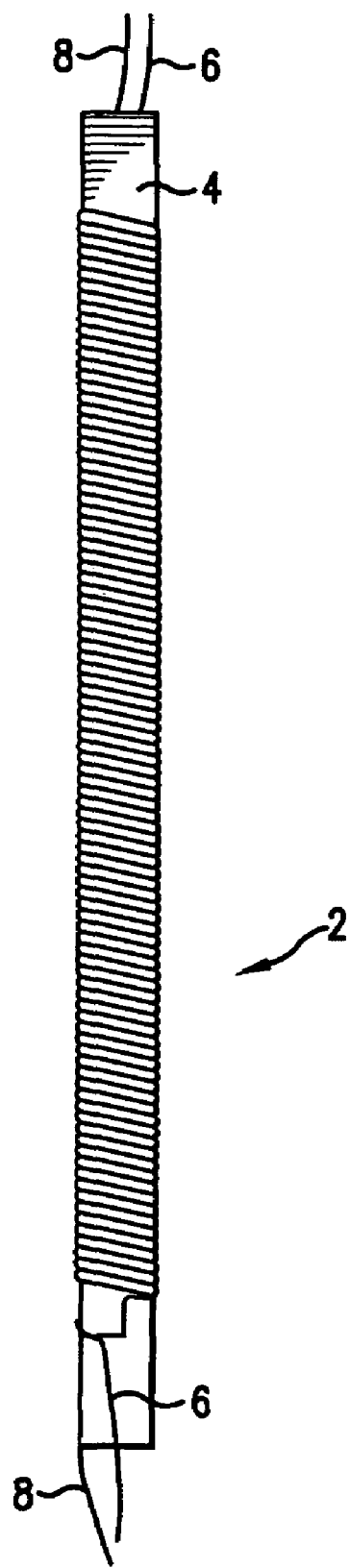
FIG. 1 is a top perspective view of an amorphous core receiver antenna used with the present invention.

Referring to FIG. 1, amorphous core receiver antenna 2 is illustrated, which is sized to fit into the grout region of a conventional tile floor. Core receiver antenna 2 consists of about 30 layers of a suitable amorphous ribbon 4, such as VC6025F available from Vacuumschmelze GmBH Co. (D-6450 Hanau, Germany), or other amorphous alloy with similar magnetic properties. Each amorphous ribbon is of approximate dimension of 1 cm. wide by 20 cm. long, and is coated with a thin insulating layer. The coating on each ribbon is sufficient to electrically isolate all layers to prevent eddy current losses. A thin dielectric layer is then placed around the core and an electrical winding 6 is placed surrounding the core. Typically, winding 6 is capacitively resonated to form a resonant R, L, and C series circuit. A secondary winding 8 is then placed over the first to allow an electrically isolated output, which can be cabled into a conventional electronic article surveillance receiver input. Preferably, the primary winding 6 and secondary winding 8 should be over the middle 75% of the core.

Figure 2:
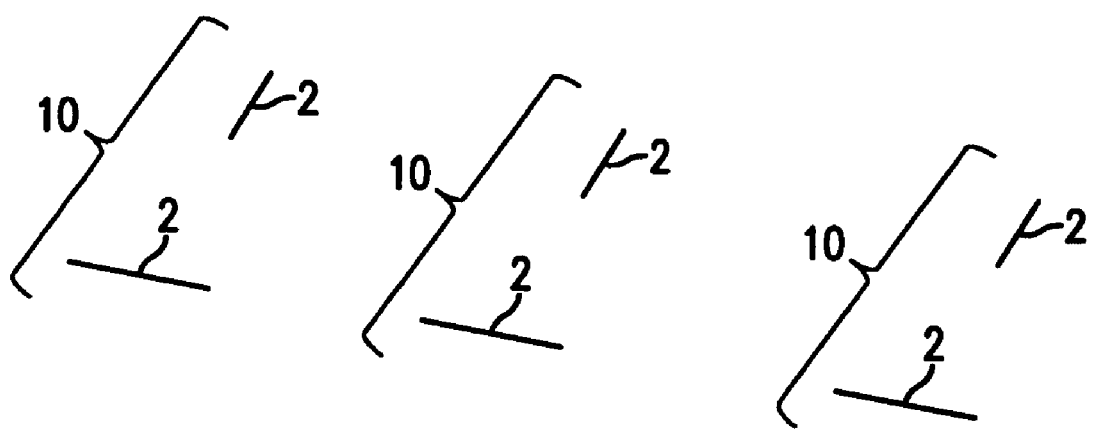
FIG. 2 is a perspective view of one implementation of array of receiver antennas of FIG. 1.

Referring to FIG. 2, a layout of a small array of core receiver antennas 2 mounted on the floor is illustrated. Two core receiver antennas 2 form an orthogonal pair 10. Three orthogonal pairs 10 are shown, but fewer or more pairs can be implemented in a particular installation depending on the width of the entrance/exit. Each orthogonal pair 10 of receiver core antennas 2 are summed electrically and forms one channel input. Orthogonal pairs 10 are summed rather than parallel pairs to improve noise immunity. If noise were mainly coming from one direction, summing in an orthogonal manner will yield improved signal/noise ratio.

Figure 3:
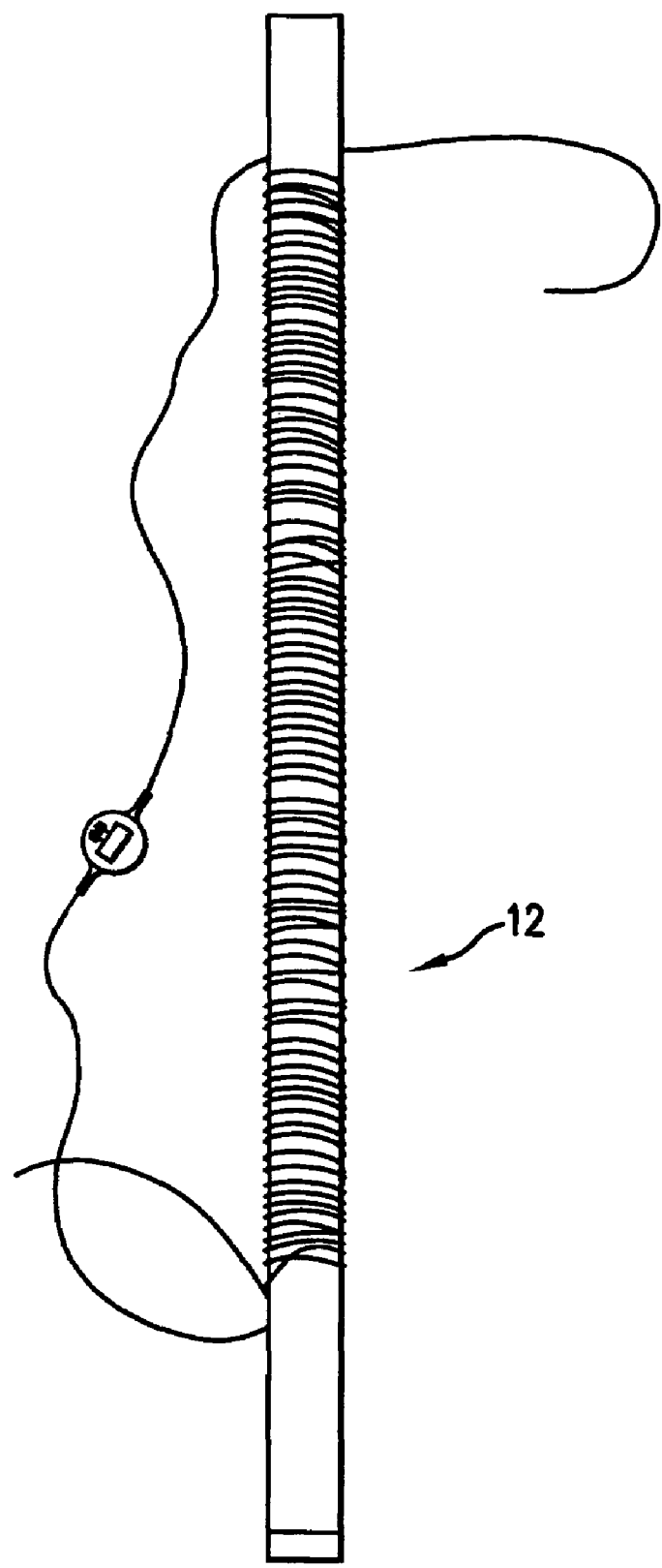
FIG. 3 is a top perspective view of a large amorphous core receiver antenna used with the present invention.

Referring to FIG. 3, large amorphous core receiver antenna 12 is very similar to amorphous core receiver antenna 2, described above. A typical overall size of antenna 12 is about 75 cm. long by 2 cm. wide by about 30 ribbons thick. In some installations it may not be possible to use small core receiver antennas 2 installed in the floor, as shown in FIG. 2. Alternatively, an array of larger core receiver antennas 12 may be placed overhead on, or above the ceiling, and/or on the sidewalls of the entrance zone of the store.

Figure 4:
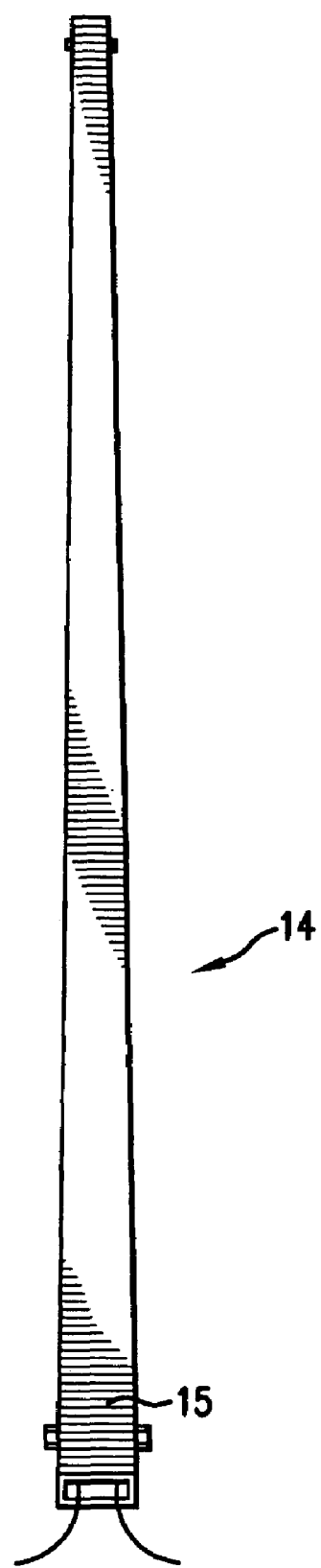
FIG. 4 is a top perspective view of a large ferrite core transmitter antenna used with the present invention.

Referring to FIG. 4 magnetic core transmit antenna 14, which includes a long ferrite or magnetic material core with excitation windings, is illustrated. In one embodiment, a plurality of ferrite blocks, each about 1 inch wide by 0.5 inch high and 3 inches long, is glued together to form a closely bound chain. Suitable ferrite blocks are Phillips 3C90 soft ferrite blocks. A plastic, or similar, housing 15 encloses and protects the ferrite core. Additional magnetic core configurations and construction methods are disclosed in commonly owned U.S. Provisional Application Ser. No. 60/478,943, the teachings of which are incorporated herein by reference. An array of windings connected in series/parallel combinations is employed to maximize the power transfer from the electronics into the ferrite core, thus maximizing the field distribution. The ferrite core transmit antenna 14 is a much smaller profile than a conventional loop transmit antenna.

Any of the core antennas described herein may also be constructed from a nanocrystalline material, as described in U.S. patent application Ser. No. 10/745,128, the disclosure of which is incorporated herein by reference. A nanocrystalline core antenna may include a plurality of ribbons of nanocrystalline material laminated together with suitable insulation coatings. As will be recognized by those skilled in the art, nanocrystalline material begins in an amorphous state achieved through rapid solidification techniques. After casting, while the material is still very ductile, a suitable coating such as $SiO_2$ may be applied to the material. This coating remains effective after annealing and prevents eddy currents in the laminate core. The material may be cut to a desired shape and bulk annealed to form the nanocrystalline state. The resulting nanocrystalline material exhibits excellent high frequency behavior up to the RF range, and is characterized by constituent grain sizes in the nanometer range. The term "nanocrystalline material" as used herein refers to material including grains having a maximum dimension less than or equal to 40 nm. Some materials have a maximum dimension in a range from about 10 nm to 40 nm.

Exemplary nanocrystalline materials useful in a nanocrystalline core antenna include alloys such as FeCuNbSiB, FeZrNbCu, and FeCoZrBCu. These alloys are commercially available under the names FINEMET, NANOPERM, and HITPERM, respectively. The insulation material may be any suitable material that can withstand the annealing conditions, since it is preferable to coat the material before annealing. Epoxy may be used for bonding the lamination stack after the material is annealed. This also provides mechanical rigidity to the core assembly, thus preventing mechanical deformation or fracture. Alternatively, the nanocrystalline stack may be placed in a rigid plastic housing.

Figure 5:
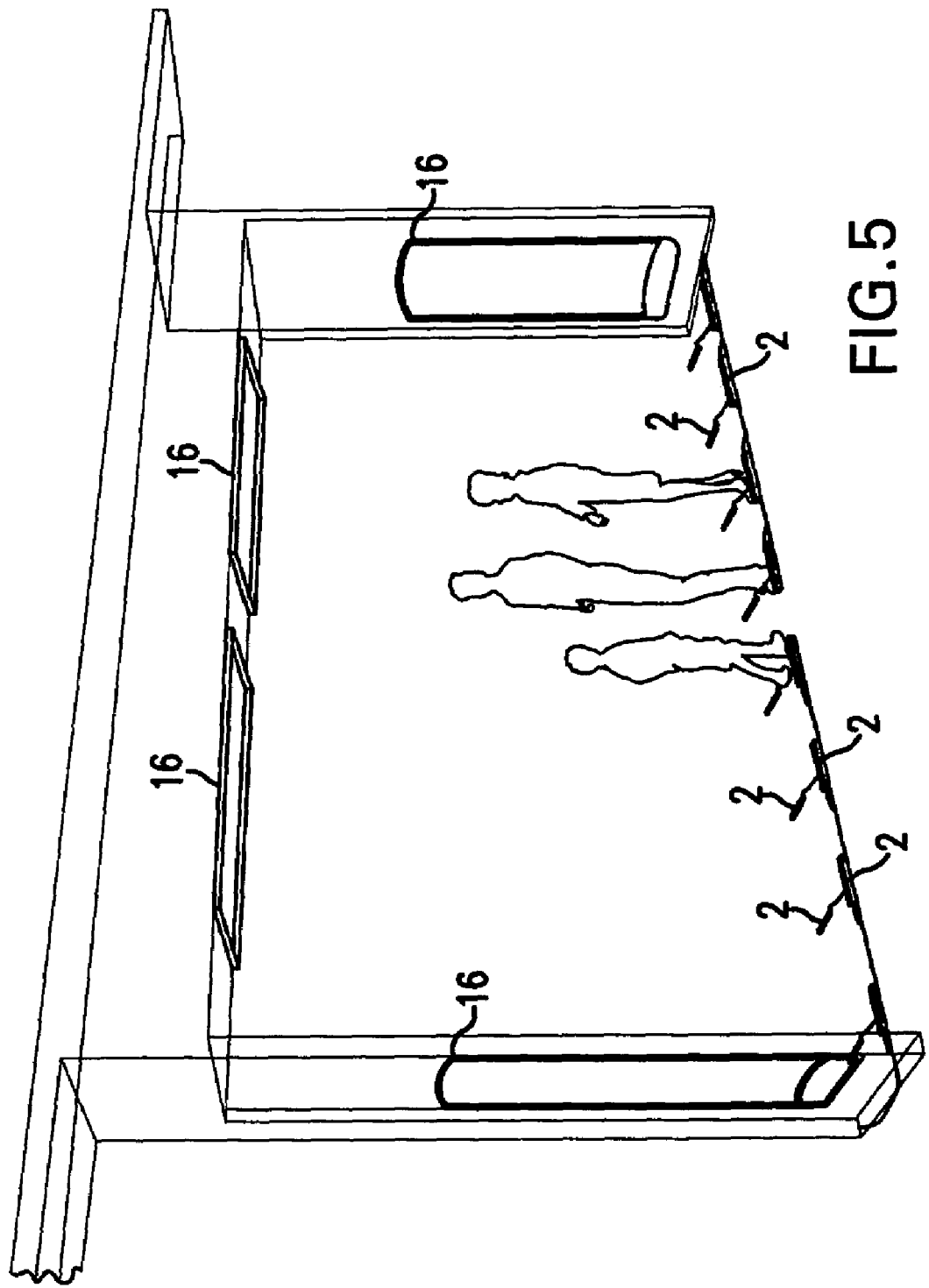
FIG. 5 is a schematic representation of one embodiment of the present invention.

Referring to FIG. 5, a wide store entrance with an array of conventional loop antennas 16 is illustrated. Two loop antennas 16 are shown overhead and one on each sidewall. An array of small core receiver antennas 2 are mounted in the floor. Testing using a conventional magnetomechanical EAS system resulted in an overall pick rate of 97% with the configuration shown in FIG. 5 in an entrance with dimensions of 14 feet wide and 10 feet high.

Figure 6:
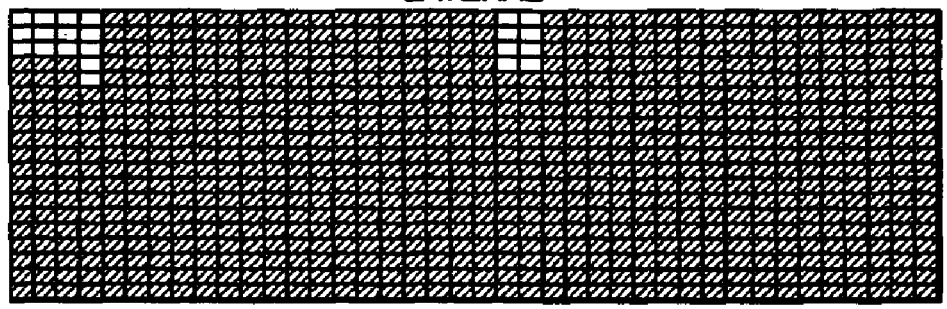
FIGS. 6-8 are plots of the EAS tag pick rate for the embodiment of FIG. 5 for a 14-foot wide by 10-foot high entrance.
Figure 7:
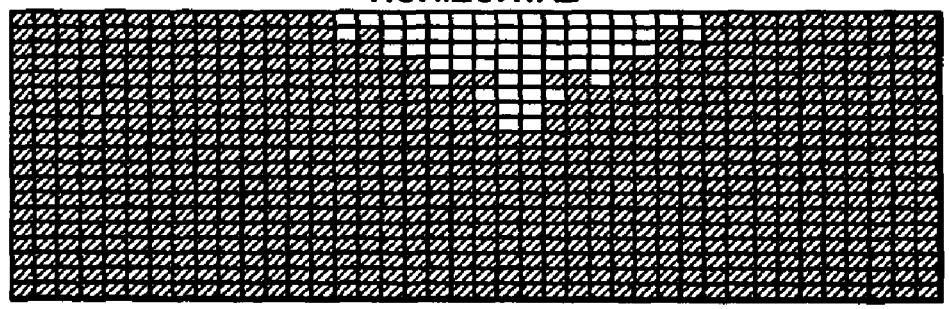
Figure 8:
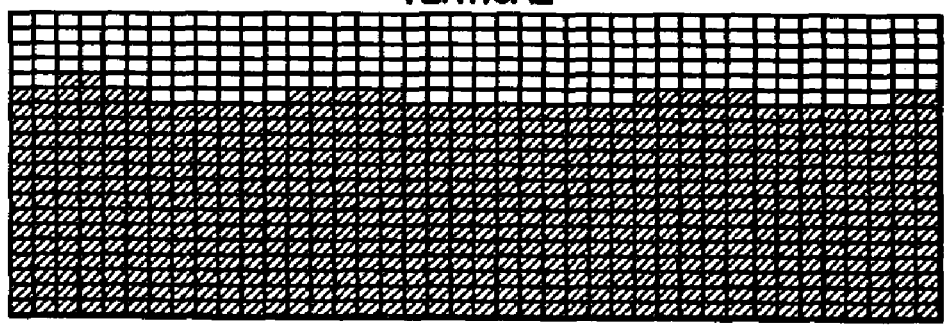
Figure 9:
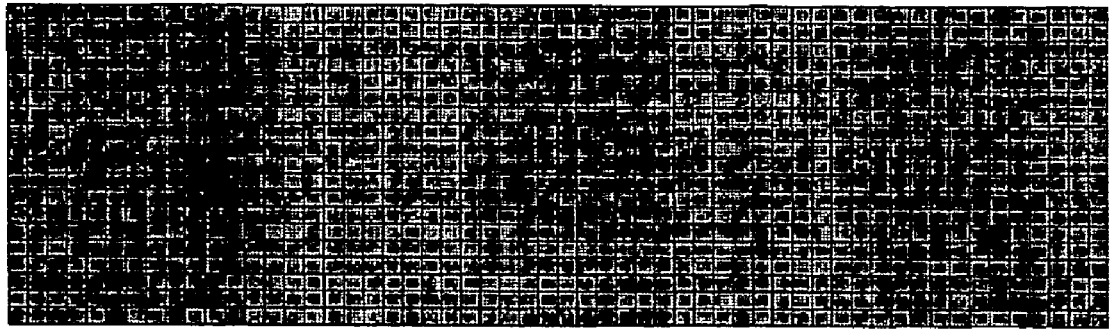
FIGS. 9-11 are plots of the EAS tag pick rate for the embodiment of FIG. 5 for an 18-foot wide by 10-foot high entrance.
Figure 10:
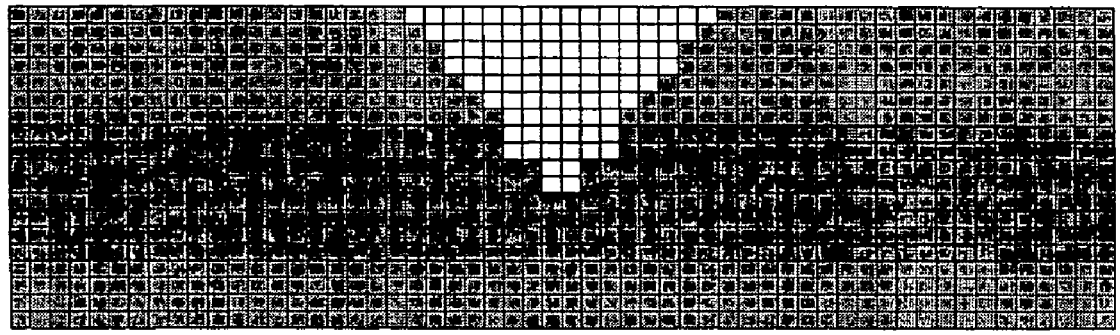
Figure 11:
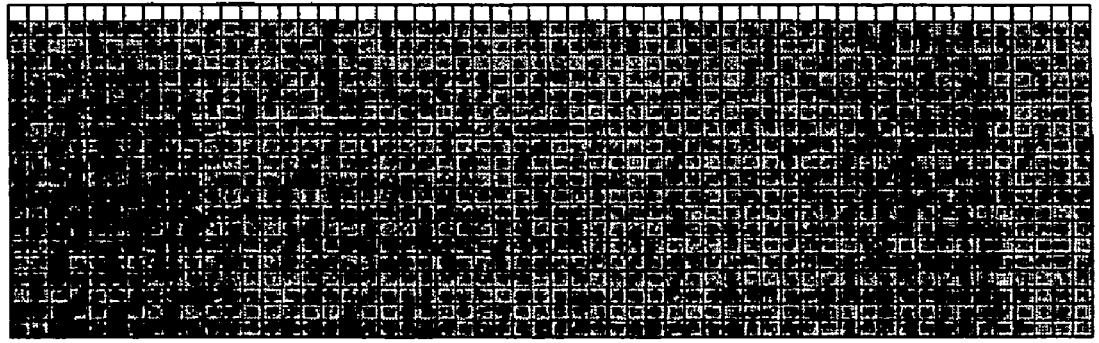

Referring to FIGS. 6-8, the results of the above-mentioned performance test in a 14-foot wide by 10-foot high entrance are shown for an EAS tag in the lateral, horizontal, and vertical orientations, respectively, wherein the dimensions of the plots in each of FIGS. 6-8 correspond to the height and width dimensions of the tested exit area. The pick rate is an indication of system performance and indicates how well the system can detect an EAS tag in the surveillance zone of the store entrance formed by the antenna configuration. It is the probability of tag detection. The shaded area of each figure shows detection of an EAS tag. In the examples below the pick rate is determined in the region extending from 0 to about 150 centimeters above the floor. Referring to FIGS. 9-11, the results of a similar test to the above-mentioned performance test for an 18-foot wide by 10-foot high entrance are shown for the lateral, horizontal, and vertical orientations, respectively, with an overall pick of 94%.

Figure 12:
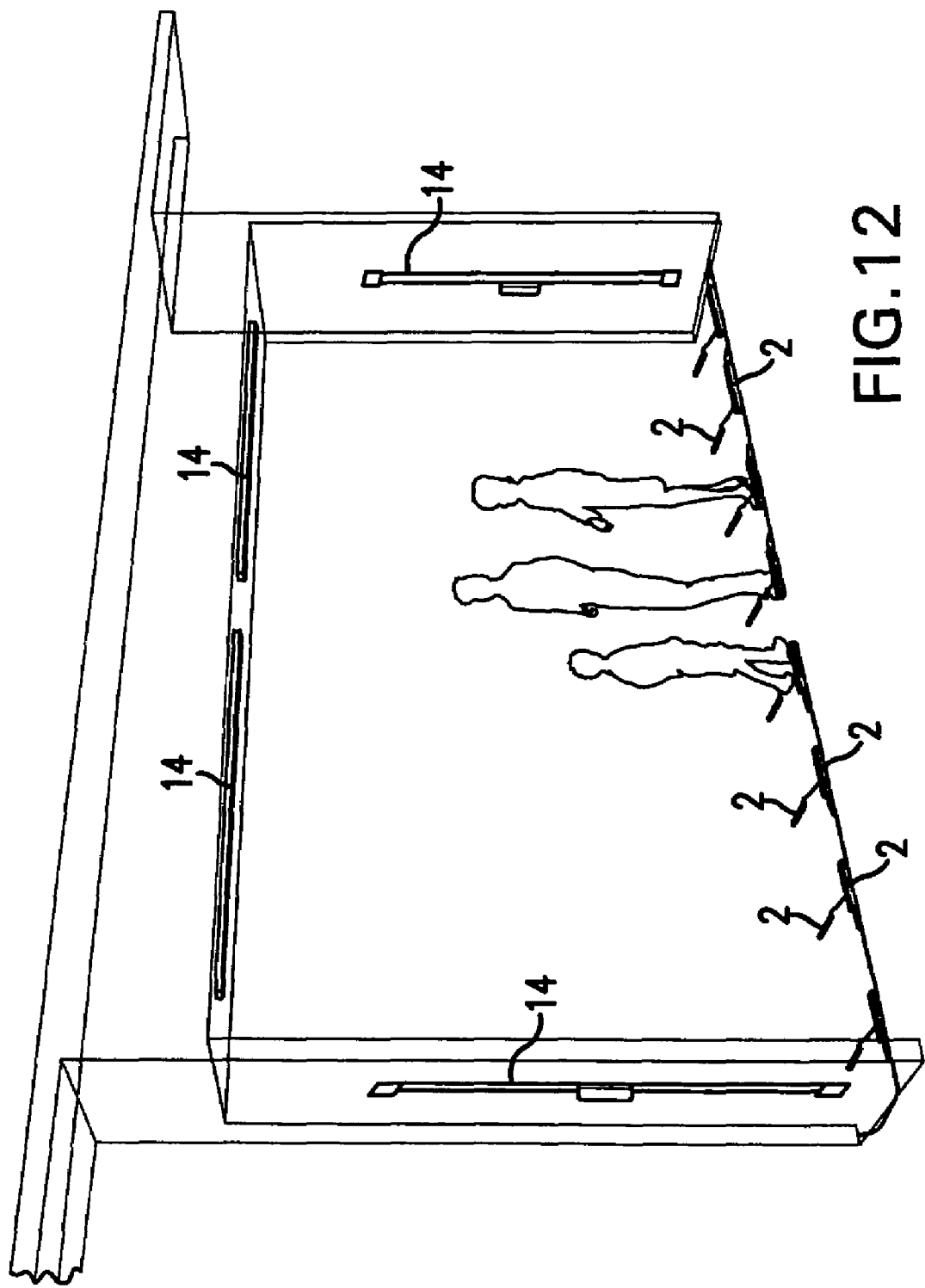
FIG. 12 is a schematic representation of a second embodiment of the present invention.

Referring to FIG. 12, a wide store entrance with an array of ferrite transmit antennas 14 is illustrated. Two ferrite transmit antennas 14 are mounted in or on the ceiling, and one on each sidewall. An array of small core receiver antennas 2 are mounted in the floor. Although a specific antenna configuration is illustrated in FIG. 12, the core antennas may be provided in a variety of configurations, including, for example, the configurations disclosed in commonly owned U.S. Provisional Application Ser. No. 60/478,942, the teachings of which are incorporated herein by reference. Testing using a conventional magnetomechanical EAS system resulted in an overall pick rate of 94% with the configuration shown in FIG. 12 in an entrance with dimensions of 14 feet wide and 10 feet high.

Figure 13:
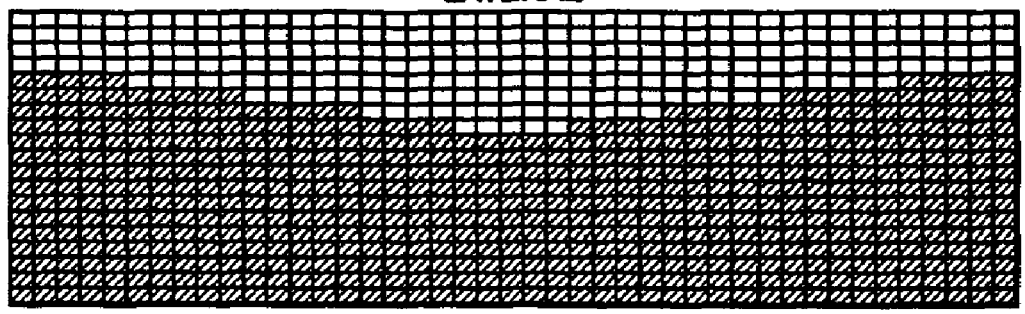
FIGS. 13-15 are plots of the EAS tag pick rate for the embodiment of FIG. 12 for a 14-foot wide by 10-foot high entrance.
Figure 14:
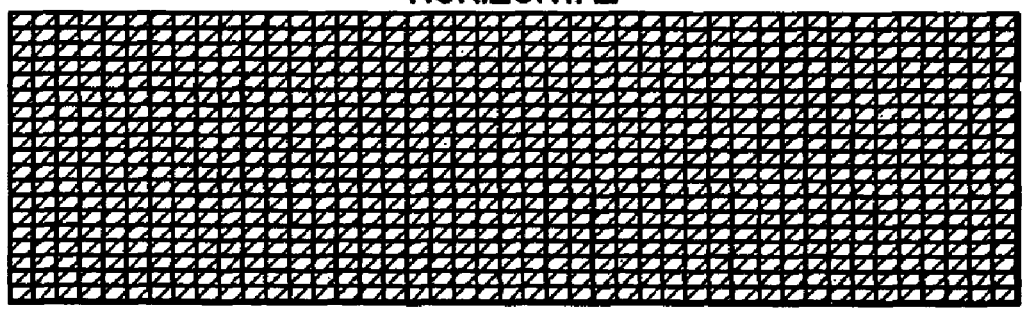
Figure 15:
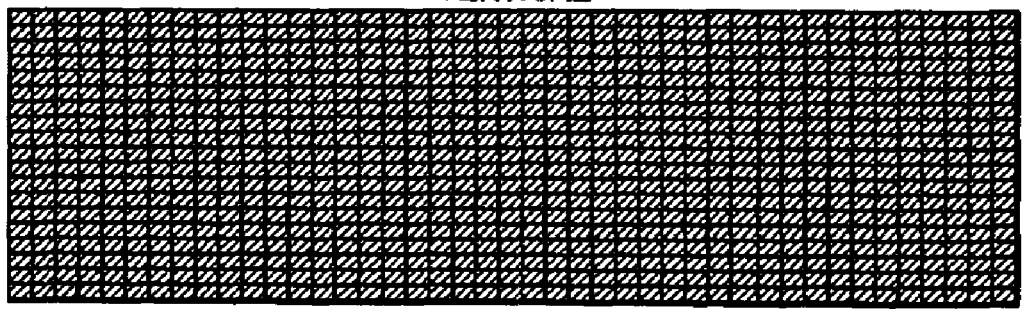

Referring to FIGS. 13-15, the results of the above-mentioned performance test for the configuration shown in FIG. 12 in a 14-foot wide by 10-foot high entrance are shown for the lateral, horizontal, and vertical orientations, respectively.

Figure 16:
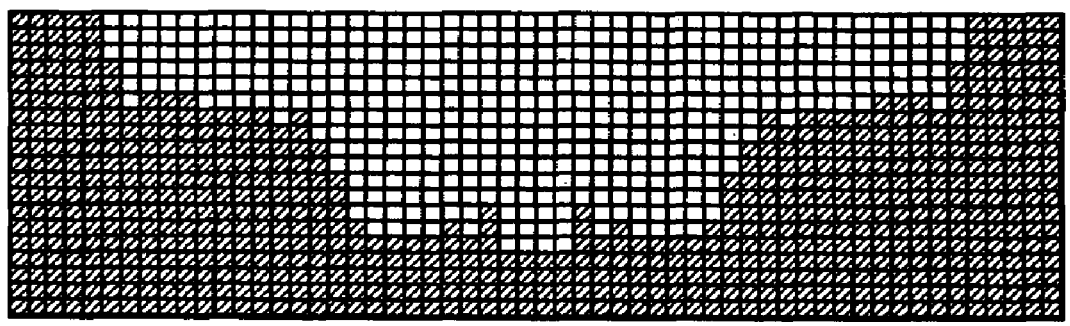
FIGS. 16-18 are plots of the EAS tag pick rate for the embodiment of FIG. 12 for an 18-foot wide by 10-foot high entrance.
Figure 17:
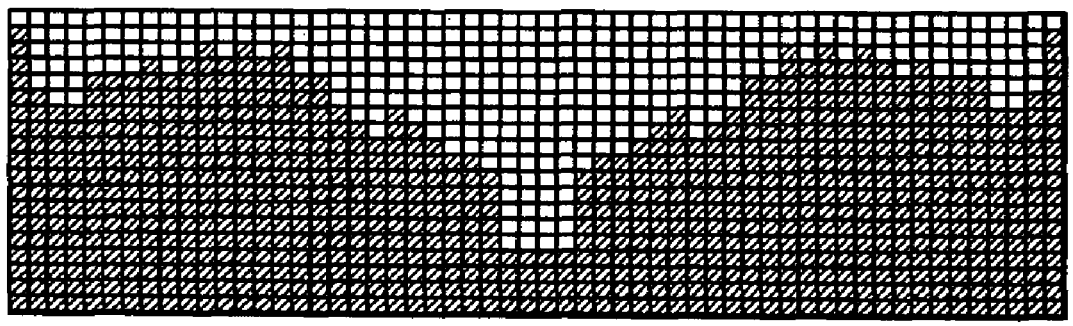
Figure 18:
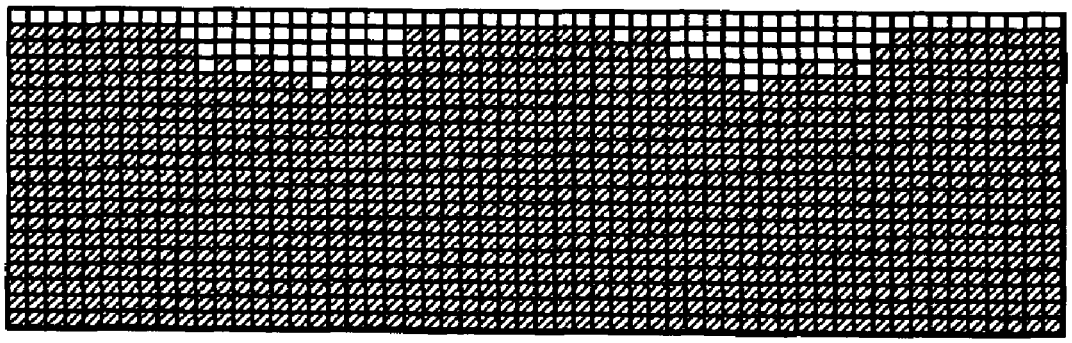

Referring to FIGS. 16-18, the results of a similar test to the above-mentioned performance test in an 18-foot wide by 10-foot high entrance are shown for the lateral, horizontal, and vertical orientations, respectively, with an overall pick of 83%.

Figure 19A:
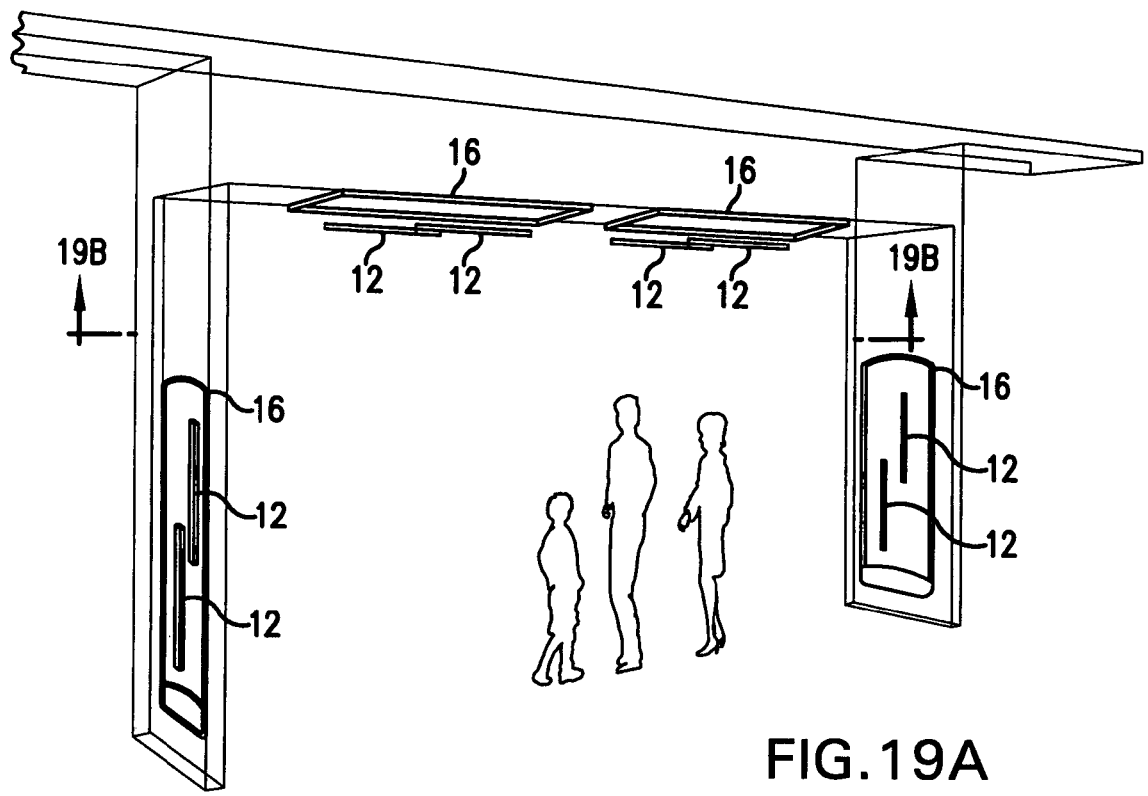
FIG. 19A is a schematic representation of a third embodiment of the present invention.
Figure 19B:
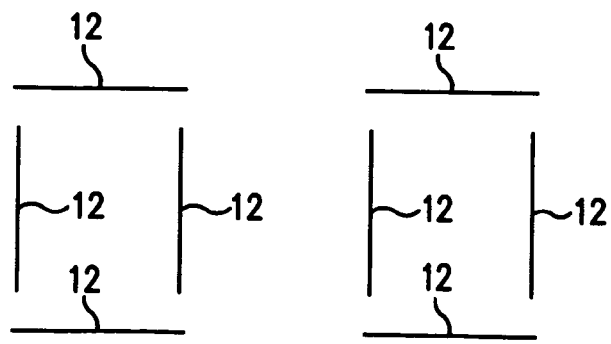
FIG. 19B is a partial cross-sectional view taken along line 19B in FIG. 19A.

Referring to FIG. 19A, a wide store entrance with an array of conventional loop antennas 16 and an array of large amorphous core receiver antennas 12 is illustrated. An array of core receiver antennas 12 are mounted in or on the ceiling, and two on each sidewall. Referring also to FIG. 19B, the array of core receivers 12 is shown and includes two sets of four antennas in the orientation illustrated. The loop antennas 16 are not shown in FIG. 19B for clarity. Testing using a conventional magnetomechanical EAS system with the configuration shown in FIGS. 19A and 19B in an entrance with dimensions of 14 feet wide and 10 feet high resulted in a maximum pick rate of 91% with the overhead receiver antennas mounted at 8.5 feet above the floor.

Figure 20:
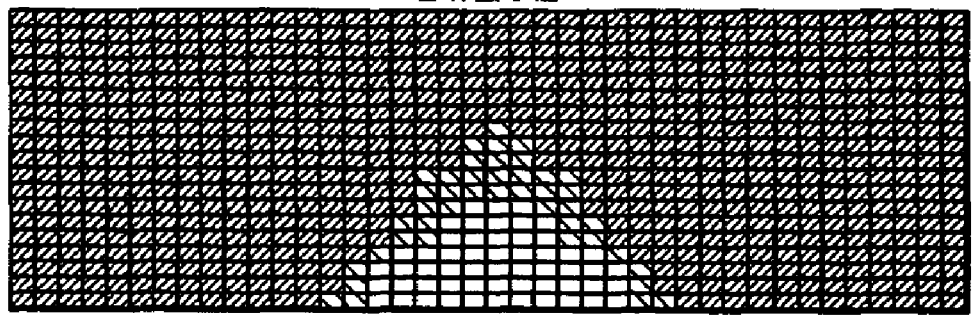
FIGS. 20-22 are plots of the EAS tag pick rate for the embodiment of FIG. 19 for a 14-foot wide by 10-foot high entrance.
Figure 21:
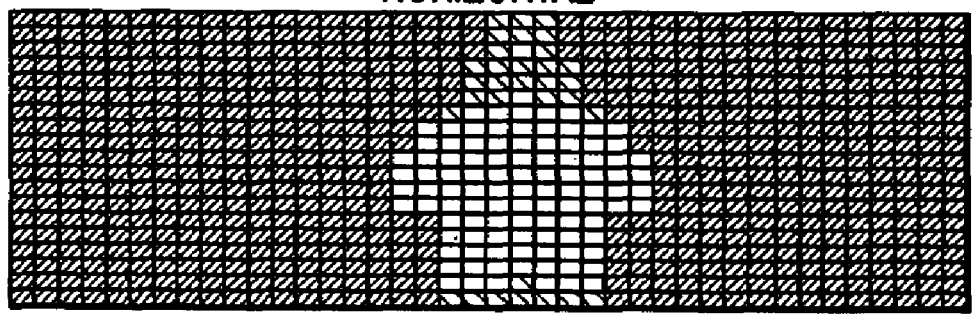
Figure 22:
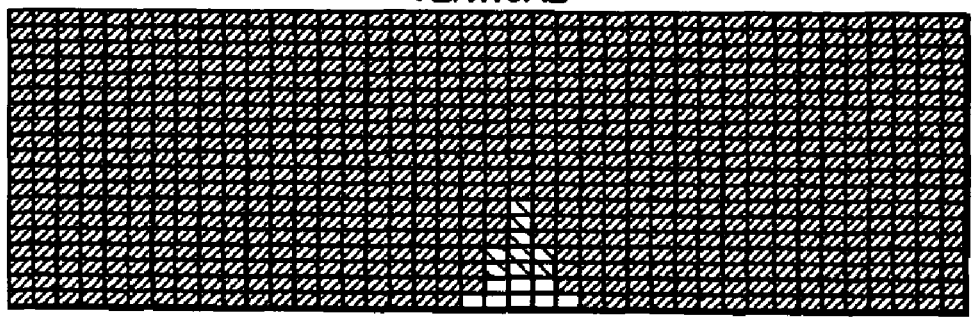

Referring to FIGS. 20-22, the results of the above-mentioned performance test for the configuration shown in FIG. 19 in a 14-foot wide by 10-foot high entrance are shown for the lateral, horizontal, and vertical orientations, respectively. If small core receiver antennas 2 mounted in the floor are added to this configuration, the pick rate increases to 100%.

Additional configurations resulted in reduced pick rate performance in comparison to the examples illustrated hereinabove. The pick rates demonstrated in the above configurations compare favorably with conventional EAS systems and result in interrogation zones covering wide entrances and are installable in an existing retail store without tearing up the flooring to the extent required for conventional antennas.

Figure 23:
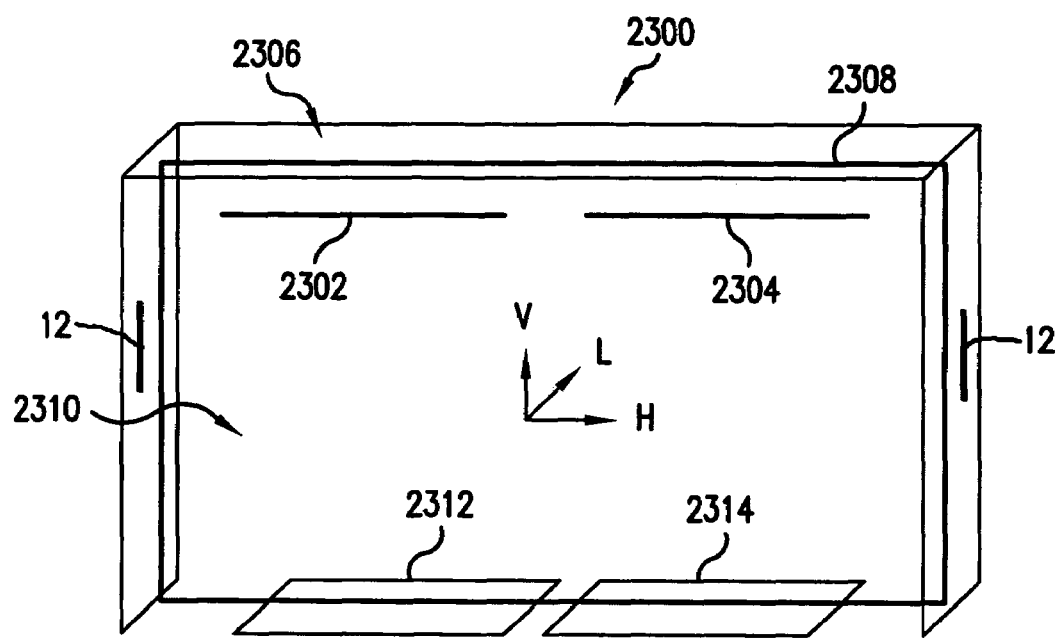
FIG. 23 is a schematic representation of a fourth embodiment of the present invention.

Referring to FIG. 23, a wide store entrance including another embodiment 2300 of an antenna configuration consistent with the invention is illustrated. The illustrated exemplary embodiment 2300 includes: first 2302 and second 2304 magnetic core transmitter/receiver antennas mounted to the ceiling 2306; a perimeter loop antenna positioned around the entire perimeter of the exit area 2310, i.e. traversing the top, bottom and sides of the exit area; and first 2312 and second 2314 receiver loop antennas positioned in or on the floor.

The two magnetic core antennas 2302, 2304 may be configured to act as transmitters and receivers (i.e. as transceivers). When functioning as transmitters, fields generated by the antennas 2302, 2304 may be configured to oppose each other to establish some vertical component of magnetic field in the center of the exit area 2310, as well as to provide magnetic field cancellation at a distance for compliance with regulatory requirements. When functioning as receivers, the antennas 2302, 2304 may switch between aiding and opposing mode.

The perimeter loop antenna 2308 encompassing the entire exit area 2310 may also be configured as a transceiver. The loop antenna 2308 augments the lateral direction L (direction perpendicular to the exit plane) of the magnetic field. To configure the antenna 2308 to act as a transceiver, the number of turns in the loop should be selected so that sufficient ampere-turns are provided during the transmit cycle to deliver sufficient magnetic field for marker excitation while reliably detecting the marker during the receiver cycle. Also, the antenna should be configured to detect the marker, but to avoid the possibility of saturation of the antenna inputs to a detector by environmental noise.

The receiver loop antennas 2312, 2314 may be disposed underneath the flooring, on top of the flooring, or in the grout area between floor tiles, and may each be surrounded by an electrostatic shield. In one embodiment, each antenna 2312, 2314 may include 15 turns of wire. The antennas may be connected as opposing, aiding, or used separately to drive independent inputs of a detector.

Although the illustrated exemplary embodiment includes two core antennas 2306, 2308, one perimeter loop antenna 2308, and two loop antennas 2312, 2314, any number of core and loop antennas may be utilized, depending, for example, on the dimensions of the exit and other design considerations. For example, the embodiment 2300 may also, or alternatively, include one or more core receiving antennas 12, on either or both sides of the exit, as shown. The receiving antennas 12 may be provided in any of the configurations described above.

Also the ceiling antennas may be configured as loop antennas, and/or the floor antennas may be configured core antennas, e.g. amorphous core antennas, as described above. The core and loop antennas can be connected in opposing or aiding configuration, and can be of dissimilar dimensions. In addition, the loop antennas may be positioned adjacent each other in the plane of the floor, as shown, or may be configured to partially or fully overlap.

Figure 24:
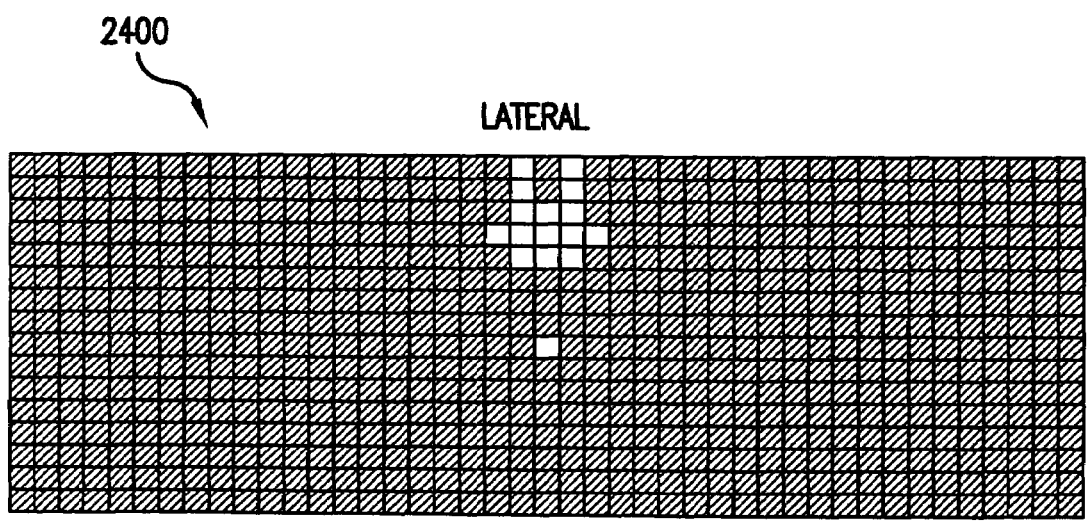
FIGS. 24-26 are plots of the EAS tag pick rate for the embodiment of FIG. 23 for a 14-foot wide by 10-foot high entrance.
Figure 25:
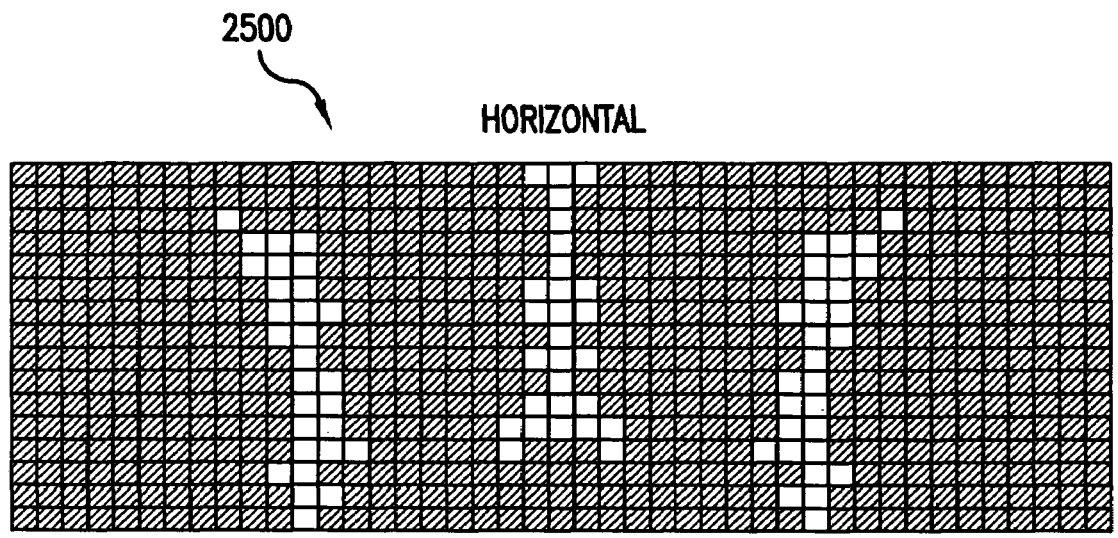
Figure 26:
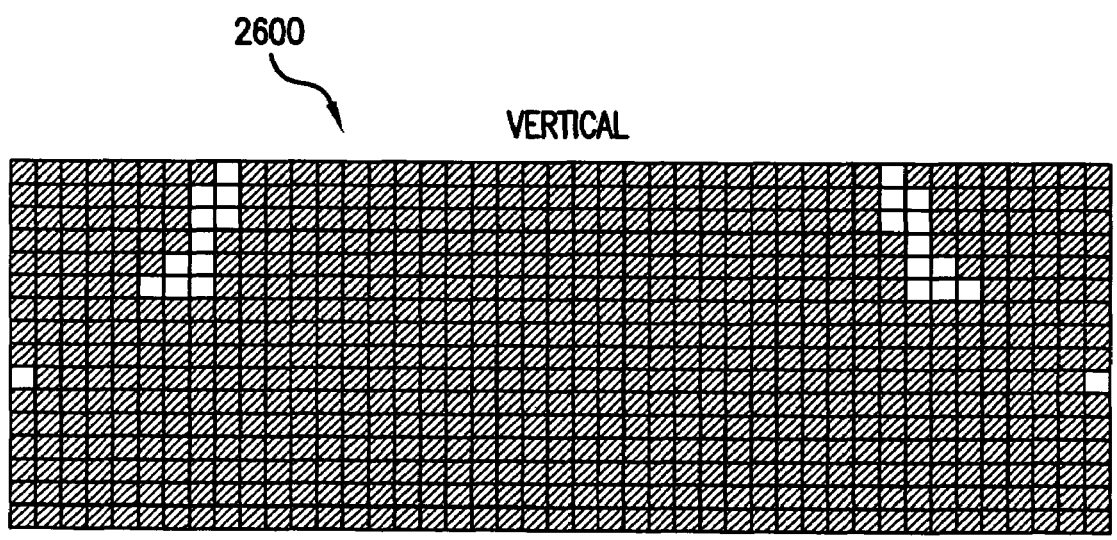

FIGS. 24-26 are plots 2400, 2500, 2600 of pick rate performance test for the lateral, horizontal, and vertical orientations, respectively, associated with a system configured as shown in FIG. 23 in an exit having a width of 14' and height of 10'. The height of the interrogation zone was established as 5' and the environmental noise was −70 mV. As shown, the pick rate performance associated with a configuration as shown in FIG. 23 compares favorably with the other embodiments described herein, as well as with conventional EAS systems.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. A method of establishing one of an EAS and RFID interrogation zone in a passageway, said method comprising:
   providing at least one ferrite transmit antenna situated adjacent at least a first side of said passageway, and at least one ferrite transmit antenna situated adjacent a second side of said passageway;
   providing at least one ferrite transmit antenna situated adjacent a ceiling of said passageway;
   providing a plurality of core antennas within a region of a floor of said passageway, said plurality of core antennas being configured as a receiver for receiving a response signal from an electronic article surveillance tag disposed said passageway, said response signal being responsive to said interrogation signal; and
   providing at least one core antenna situated within a region of a floor of a passageway.

2. The method of claim 1, wherein said passageway has a width of at least 2.0 m.

3. The meThod of claim 1 wherein at least one core antenna comprises a nanocrystalline core antenna.

4. The method of claim 1 wherein said at least one core antenna comprises an amorphous core antenna.

* * * * *